…

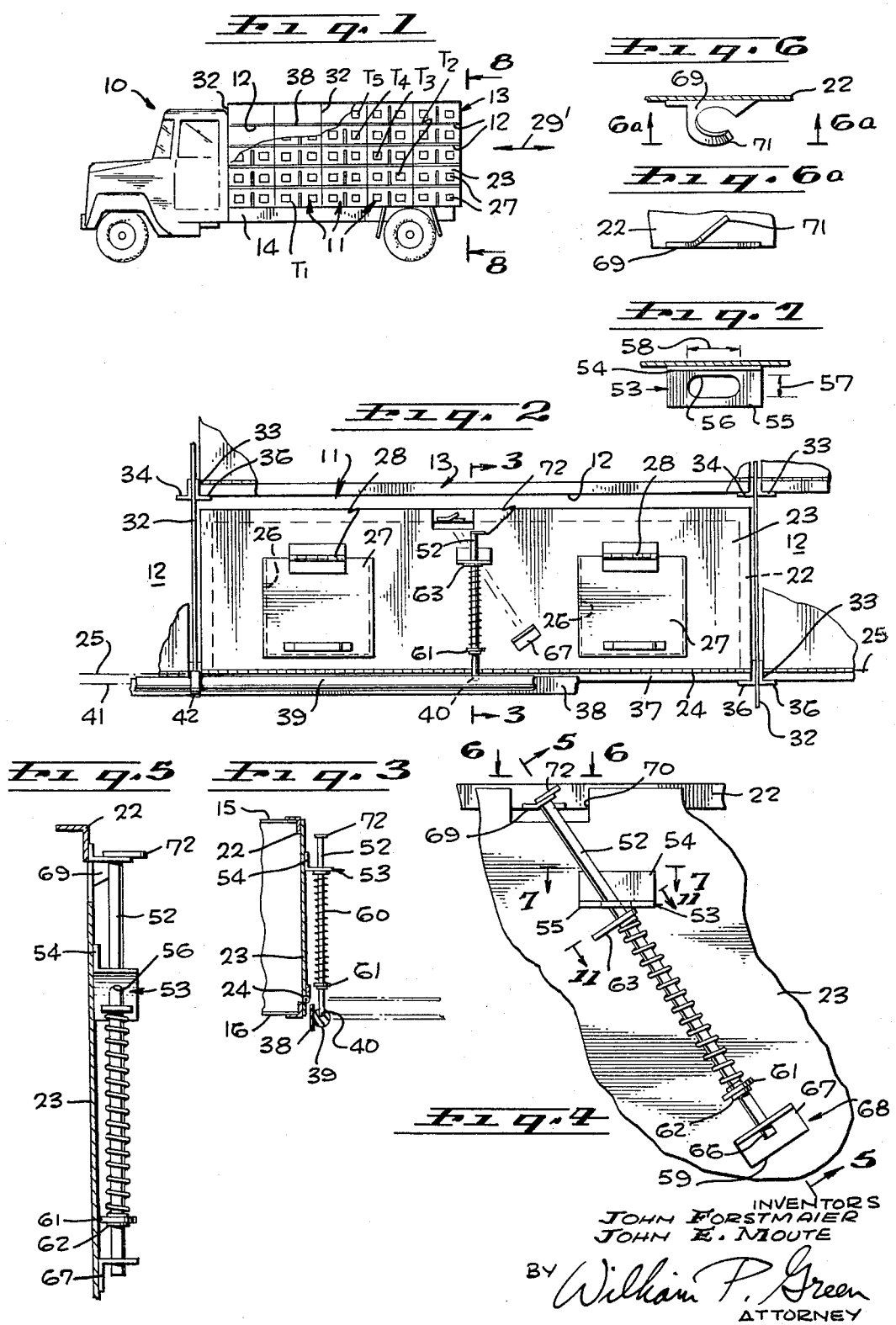

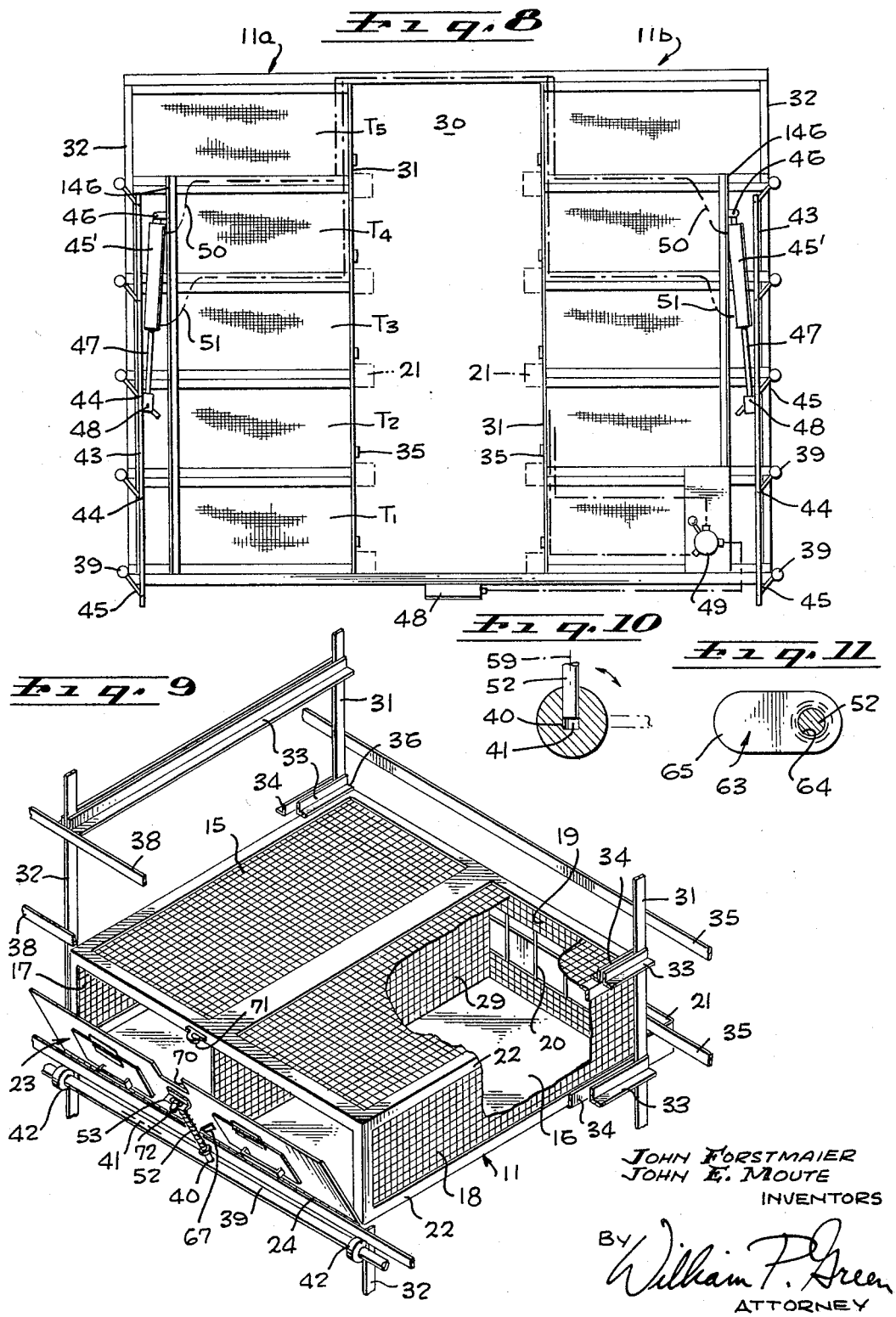

United States Patent Office 3,279,432
Patented Oct. 18, 1966

3,279,432
BIRD CAGE DOOR RELEASING FRAME
SUPPORT STRUCTURE
John Forstmaier, 549 W. 108th St., Los Angeles, Calif.,
and John E. Moute, 1449 W. 168th St., Gardena, Calif.
Filed May 10, 1965, Ser. No. 454,603
14 Claims. (Cl. 119—15)

This invention relates to an improved cage arrangement which is particularly adapted in certain respects for easily transporting and releasing racing pigeons, though it will of course be understood that the present cages may be employed for other purposes if desired.

The sport or hobby of pigeon racing has in recent years become increasingly more popular, to the extent that very frequent races are now held in all parts of the country over courses many miles in length. In the conduct of such a race, the competing birds are all transported to a particular starting location in cages carried by a motor vehicle, and are then released simultaneously to return to their various homes by instinct.

The general object of the present invention is to provide an improved cage assembly for thus transporting the birds to a starting location, and releasing the birds with maximum facility. Particularly contemplated is a frame structure adapted to removably receive a number of individual cages, which cages may be utilized for individually carrying dfferent groups of birds to and from the vehicle, and which in their installed position may be simultaneously opened to release the birds from all of the cages.

A specific object of the invention is to provide a novel arrangement for actuating the doors of the cages between open and closed positions, while the cages are mounted in the frame of the vehicle or other structure, but by actuating mechanism which is at all times retained on the frame, even when the cages are removed. This mechanism is adapted to interfit with an actuating element or mechanism carried on each of the cages, desirably on their doors, so that the frame carried mechanism can actuate the doors readily and easily when the cages are on the frame, and yet the cage carried mechanism may still be easily detached from the frame carried apparatus to enable removal of the cages from the frame. As will appear, the preferred actuating arrangement includes a rod mounted to the frame and adapted to turn about its longitudinal axis, and having a portion adapted to interfit with the actuating mechanism of the cages, desirably by reception of a portion of that actuating mechanism within a socket recess contained in the rod.

Preferably, the mechanism carried by the cage and which is engageable by the frame mounted operating apparatus, also serves a secondary function of latching the cage door in closed position when the cage is removed from the frame. To attain this duel function, the apparatus may include a second rod mounted to the cage door, and adapted to swing between a first door operating position, and a second door latching position.

The above and other features and objects of the invention will be better understood from the following detailed description of the typical embodiment illustrated in the accompanying drawings, in which:

FIG. 1 is a side view of a truck having a cage structure constructed in accordance with the invention;

FIG. 2 is an enlarged view showing a portion of FIG. 1;

FIG. 3 is a fragmentary vertical section taken on line 3—3 of FIG. 2;

FIG. 4 is a view showing the cage carried latching and actuating parts in latching condition;

FIGS. 5, 6 and 7 are sections taken on lines 5—5, 6—6 and 7—7 respectively of FIG. 4, but with FIG. 6 showing only the keeper and not the latching element;

FIG. 6a is taken on line 6a—6a of FIG. 6;

FIG. 8 is a rear view of the FIG. 1 truck, taken on line 8—8 of FIG. 1;

FIG. 9 is a perspective representation of the frame and cage structure;

FIG. 10 is an enlarged section taken on the lower portion of the line 3—3 of FIG. 2; and FIG. 11 is taken on line 11—11 of FIG. 4.

Referring first to FIG. 1, we have shown at 10 a truck or other motor vehicle which is to be used for transporting a number of cages 11 containing racing pigeons to a release location. The cages 11 are mounted within individual compartments 12 formed in and by a rigid rectangular frame structure 13 which is mounted on and rigidly secured to the horizontal bed 14 of the truck.

The various cages 11 may all be identical, and have the configuration illustrated clearly in FIG. 9. More particularly, each of these cages may be rectangular in shape, having parallel horizontal top and bottom walls 15 and 16 interconnected by two parallel vertical rectangular opposite side walls 17 and 18, and a rectangular rear wall 19 extending perpendicular to all of the walls 15, 16, 17 and 18. Each of these walls 15, 16, 17, 18 and 19 may be formed of a cage type wire screen material, except at the location of a series of apertures 20 in the rear walls 19 through which the contained birds may feed from troughs 21 mounted to the frame near these apertures. The screen walls are also of course reinforced by rigid cage frame elements 22 extending about and defining the walls, and containing and holding the screen portions of the walls.

The sixth side of each of the cages 11 is closed by a door 23, which in its closed position extends parallel to rear wall 19, and is hinged at 24 at the lower edge of the door to swing downwardly and outwardly about a horizontal axis 25 to an open position in which the birds are free to leave the cage. Door 23 may be formed of a piece of planar sheet metal, which may be imperforate except at the location of two openings 26 which are closed by two smaller doors 27 hinged to the main door 23 at 28. Interiorly, the cage may be divided by a partition wall 29, formed of screening or the like, to form two inner compartments accessible through the two individual doors 27 respectively.

As will be apparent from FIG. 1, the frame 13 is adapted to receive cages 11 within compartments 12 in positions in which the doors 23 of the individual cages face laterally to a side of the truck, that is, transversely of the front to rear direction 29′ (FIG. 1) in which the truck travels. Further, it will be seen in FIG. 8 that the cages are arranged in two front to rear groups or rows 11a and 11b, facing toward the two opposite sides of the vehicle, and defining a space 30 between the two rows 11a and 11b into which a person may walk to feed and otherwise have access to the birds. Each of the two rows 11a and 11b of cages includes several superimposed tiers $T_1$, $T_2$, $T_3$, $T_4$ etc. of cages (FIG. 1), with each tier consisting of a series of the individual boxes in horizontal alignment in a front to rear direction relative to the vehicle.

To define the compartments 12 within which the various cages 11 are received, frame 13 may include, at opposite sides of the truck, two series of parallel vertical rigid metal frame elements 32 projecting upwardly from truck bed 14 at spaced locations (see FIGS. 1 and 9). These elements are spaced apart just sufficiently to receive the individual cages therebetween. Spaced inwardly from the sides of the truck, two additional series of similar vertical frame elements 31 project upwardly from the truck bed (see FIGS. 8 and 9). FIG. 8 shows the rear one of each of these series, with the others being aligned with these rear ones in a front to rear direction and being in alignment transversely of the vehicle with corresponding ones of the elements 32. Extending between and interconnecting elements 31 and 32, the frame 13 includes a number of angle irons 33 and 34, which extend horizontally and transversely of the vehicle.

As seen best in FIGS. 2 and 9, each of the compartments 12 formed by the above discussed frame structure is of a size to substantially exactly receive one of the cages 11, with the cage supported on the horizontal flange portions 36 of two of the angle irons 33 and 34. The cage is slidable horizontally on these angle irons (transversely of the truck) into the FIG. 1 position within its respective compartment, and is similarly withdrawable from that compartment by outward sliding movement along the angle irons. In the active position within compartment 12, the back wall 19 of the cage engages against a rigid back frame member 35 of the compartment, which frame member extends between and interconnects a series of the vertical frame elements 31. The cage is retained against unintended sliding movement out of compartment 12 by engagement of a front lower portion 37 of the cage (to which door 23 is hinged) with a rigid metal member 38 which extends horizontally in a front to rear direction between, and is welded to, a series of the vertical elements 32 (see FIGS. 2 and 9), and whose upper horizontal edge projects upwardly slightly above the level of horizontal flanges 36 of angle irons 33 and 34, so that each cage must be elevated slightly above the level of the engaged flanges 36, and above the associated element 38, during insertion or withdrawal of the cage past elements 38. The hinge 24 which mounts door 23 may, in the fully installed position of the cage, be located slightly above the level of the upper edge of element 38.

For actuating the doors 23 of the various cages between open and closed positions, there are mounted on frame 13 a series of parallel horizontally extending rods 39 which may be externally cylindrical except as interrupted by certain socket recesses 40 formed therein. Each of the rods 39 is located closely adjacent and parallel to the hinges 24 of one of the tiers ($T_1$, $T_2$, $T_3$, etc.) of cages 11, with the axes 41 of the rods extending in a front to rear direction relative to the vehicle. Each rod 39 is mounted by a series of bearings 42, suitably secured to frame 13, for rotary movement of the rod about its individual horizontal axis 41. All of the rods are interconnected for limited rotary actuation about their axes in unison by means of two vertically extending rigid actuating members 43 (FIG. 8), which are pivoted at 44 to arms 45 projecting from the various rods 39 respectively, with arms 45 extending transversely or radially of the rod axes 41. As will be apparent from FIG. 8, downward movement of members 43 will act to swing the left hand rods 39 of that figure through a predetermined angle in a clockwise direction, and to correspondingly swing the right hand group of rods 39 through the same angle in a counter-clockwise direction. Members 43 are actuated downwardly and upwardly in unison by two piston and cylinder units 45', whose cylinders are pivoted at 46 to members 146 attached to frame 13, and whose piston rods 47 are pivotally connected at 48 to two of the arms 45. Actuating air or other pressure fluid is supplied to the piston and cylinder mechanisms 45' simultaneously from a diagrammatically represented source 48 of compressed air or the like, and under the control of a manually operated three way valve 49, which may be turned to a first position for admitting air to the upper ends of both of the cylinders through lines 50 (to lower members 43), a second position for admitting air to the lower ends of the cylinders through lines 51 (for raising elements 43), and a third position in which all air is closed off. Obviously, valve 49 allows air to discharge from whichever ends of the cylinders are not receiving air under pressure in a particular setting of the valve.

For coaction with rods 39, and actuation thereby, each of the cage doors 23 movably carries a mechanism which includes a smaller rod or element 52, which may be formed essentially of an externally cylindrical straight rigid metal piece of rod stock (FIGS. 2, 3, 4 and 9). Rod 52 is movably carried by and received within a mounting bracket 53, having a mounting flange portion 54 welded or otherwise secured to the forward side of cage door 23, and having an outwardly projecting flange 55 extending perpendicular to flange 54 and the door, and containing an opening 56 through which rod 52 extends. In the closed position of the door (FIG. 2), flange 55 of bracket 53 extends horizontally. As seen best in FIG. 7, the aperture 56 is slightly elongated, having a width 57 corresponding approximately to the diameter of rod 52, and having a length 58 somewhat greater than that diameter, so that the rod may swing relative to the door and within aperture 56 between the vertical full line position of FIG. 2 and the broken line position of that figure (full lines in FIG. 4) in which the axis 59 of the rod is disposed at an oblique angle with respect to the axis 41 of the associated rod 39. In the full line position of FIG. 2, the axis 59 of the rod is disposed transversely of and intersects, axis 41 of the associated rod 39.

When rod 52 is in the FIG. 2 full line position the lower end of the rod is received and closely confined within one of the socket recesses 40 in the associated rod 39, which recess has a cylindrical configuration about the same axis 59 as rod 52, with that axis intersecting and extending radially of axis 41 as will be apparent from FIG. 10. Thus, when rod 52 has its lower end received within recess 40 in the position of FIG. 10, the rotary motion of rod 39 about its axis 41 acts to correspondingly swing rod 52 about that same axis (see broken lines, FIG. 10), and by virtue of the reception of rod 52 within bracket 53, the connected door 23 is at the same time swung in an opening or closing direction between the two positions illustrated in FIG. 3. In that condition, the lower end of rod 52 is held downwardly within socket recess 40 by a coil spring 60 which is disposed about the rod, and exerts upward force against bracket 53 and downward force against a washer 61 on the rod. Washer 61 may be suitably retained against downward movement relative to the rod, as by means of a snap ring 62 received within an appropriate groove formed in the rod. Also, the upper end of the spring may exert its force against bracket 53 through an intermediate element 63, which may be somewhat elongated as shown in FIG. 11, and contains an opening 64 within which rod 52 is slidably received. The outwardly projecting portion 65 of element 63 is provided for manual engagement and actuation in a manner relieving the force of spring 60.

As has been stated previously, the rod 52 is free to be withdrawn from socket recess 40, and swung to the position of FIG. 4. In that position, the lower end of rod 52 is received within an opening 66 formed in a diagonal or oblique flange 67 of a bracket 68 which is welded or otherwise secured to door 23 of the cage. In the FIG. 4 position, the flange 67 may be disposed transversely of axis 59 of rod 53. The upper end of rod 52, in the FIG. 4 position, engages a hook element 69, which is rigidly mounted to the main frame of the cage 11, with this hook element 69 thus functioning as a latch keeper engaged by element 52 as a latch element to hold the door in closed position. The hook 69 may project through a cut away portion 70 formed in the upper edge of the door, with the hook typically being formed of sheet metal of the configuration illustrated in FIGS. 6 and 6a, and having its hook portion 71 turned upwardly at an angle or inclination to be disposed transversely of axis 59 of rod 52 in the FIG. 4 latched condition of the rod. A member 72, having the same shape as the previously discussed element 63, may be rigidly secured to the upper end of rod 52 to engage downwardly against hook 69 to thus hold the rod in latched condition and against movement downwardly out of engagement with the hook.

To now describe the manner of use of the apparatus, assume that initially none of the cages are within the frame 13, and that it is desired to load the vehicle for travel to a location at which the birds are to be freed for a race. Each of the cages 11 may be loaded with birds individually, while the cage is off of the truck. After the birds have been filled into a particular cage, the door 23 of that cage may be latched in closed condition by movement of rod 52 to the position of FIG. 4, in which its upper end is in latched engagement with keeper 69, and its lower end is in engagement with bracket flange 67. In this condition, the cage may be handled freely without danger of the door being accidentally opened. The cage is inserted transversely of the truck and from one side of the vehicle into one of the compartments 12 of the frame 13. Similarly, all of the other cages are inserted into their respective compartments until the entire frame has been filled with cages. After each cage has been positioned in the frame, the rod or element 52 carried by the door of that cage is disengaged from its keeper or hook 69, by upward movement of rod 52 along its axis 59 as viewed in FIG. 4 until the rod is out of the aperture 66, and by then swinging the rod to the broken line position of FIG. 4 and out of engagement with hook 69. If desired, the tension on spring 60 may be released during this motion by manually forcing element 63, against which the spring bears, downwardly relative to rod 52. After rod 52 has been freed from its latching condition, the rod is swung to the vertical position of FIG. 2, and its lower end is moved downwardly into one of the socket recesses 40 of an adjacent one of the actuating shafts or rods 39, with the rod 52 being held in this position by spring 60.

After all of the cages have been installed, and their rods 52 have been moved to the FIG. 2 position of engagement with rods 39, the truck may be driven to a desired release point, and valve 49 is then actuated to admit air to the lower ends of the cylinders of piston and cylinder mechanisms 45, in unison, and to release air pressure from the upper ends of these cylinders, so that members 43 are actuated upwardly in unison and all of the rods 39 are simultaneously turned in unison through corresponding angles to actuate all of the rods 52 and the connected doors 23 from the closed full line position of FIG. 3 to the opened broken line position of that figure. Thus, all of the birds are freed simultaneously for escape from the cages, so that all birds may have an identical starting time for the race. If some of the birds do not leave the cages, an operator may walk into the space 30 of FIG. 8, and frighten the birds just sufficiently to cause them to leave. After the birds have left, valve 49 is actuated to reverse the piston and cylinder mechanisms and turn rods 39 in a direction closing all of the doors. When the vehicle has returned to its home location, rods 52 may be disconnected from rods 39, and reconnected to the latch keepers 69, so that the cages may be removed, and during and after such removal be retained in closed condition.

We claim:

1. The combination comprising a plurality of cages, a frame for receiving and supporting said plurality of cages with the cages free for insertion into the frame and removal therefrom, doors on the cages mounted for removal from the frame with the cages and for movement relative to the cages between open and closed positions, an elongated rod extending along an axis and mounted to the frame to turn about said axis, an element mounted to one of said cages for removal from the frame therewith and operable to actuate said door of that cage between open and closed positions, and a detachable connection between said rod and said element for actuating said element to move the door in response to rotary movement of the rod but detachable to enable removal of said element from the frame and rod with the cage.

2. The combination comprising a plurality of cages, a frame for receiving and supporting said plurality of cages with the cages free for insertion into the frame and removal therefrom, doors on the cages mounted for removal from the frame with the cages and for movement relative to the cages between open and closed positions, an elonagted rod extending along an axis and mounted to the frame to turn about said axis, an element mounted to one of said cages for removal from the frame therewith and operable to actuate said door of that cage between open and closed positions, and a detachable connection between said rod and said element for actuating said element to move the door in response to rotary movement of the rod but detachable to enable removal of said element from the frame and rod with the cage, said connection including interfitting means on said rod and element for removably mounting the element to the rod in a position of projection therefrom essentially radially outwardly from said axis.

3. The combination comprising a plurality of cages, a frame for receiving and supporting said plurality of cages with the cages free for insertion into the frame and removal therefrom, doors on the cages mounted for removal from the frame with the cages and for movement relative to the cages between open and closed positions, an elongated rod extending along an axis and mounted to the frame to turn about said axis, an element mounted to one of said cages for removal from the frame therewith and operable to actuate said door of that cage between open and closed positions, and a detachable connection between said rod and said element for actuating said element to move the door in response to rotary movement of the rod but detachable to enable removal of said element from the frame and rod with the cage, said connection including a socket recess formed on said rod and extending essentially transversely of said axis and into which an end of said element is removably insertible.

4. The combination comprising a plurality of cages, a frame for receiving and supporting said plurality of cages with the cages free for insertion into the frame and removal therefrom, doors on the cages mounted for removal from the frame with the cages and for movement relative to the cages between open and closed positions, an elongated rod extending along an axis and mounted to the frame to turn about said axis, an element mounted to one of said cages for removal from the frame therewith and operable to actuate said door of that cage between open and closed positions, and a detachable connection between said rod and said element for actuating said element to move the door in response to rotary movement of the rod but detachable to enable removal of said element from the frame and rod with the cage, said connection including interfitting means on said rod and element for removably mounting the element to the rod in a position of projection therefrom essentially radially outwardly from said axis, and means for yieldingly urging said interfitting means on the rod and element into interfitting relation.

5. The combination comprising a plurality of cages, a frame for receiving and supporting said plurality of cages with the cages free for insertion into the frame and removal therefrom, doors on the cages mounted for removal from the frame with the cages and for movement relative to the cages between open and closed positions, an elongated rod extending along an axis and mounted to the frame to turn about said axis, an element mounted to one of said cages for removal from the frame therewith and operable to actuate said door of that cage between open and closed positions, a detachable connection between said rod and said element for actuating said element to move the door in response to rotary movement of the rod but detachable to enable removal of said element from the frame and rod with the cage, and holding means for retaining said door of said one cage in closed position in response to movement of said element relative to the cage.

6. The combination comprising a plurality of cages, a frame for receiving and supporting said plurality of cages with the cages free for insertion into the frame and removal therefrom, doors on the cages mounted for removal from the frame with the cages and for movement relative to the cages between open and closed positions, an elongated rod extending along an axis and mounted to the frame to turn about said axis, an element mounted to one of said cages for removal from the frame therewith and operable to actuate said door of that cage between open and closed positions, a detachable connection between said rod and said element for actuating said element to move the door in response to rotary movement of the rod but detachable to enable removal of said element from the frame and rod with the cage, and holding means on the cage for interfitting with said element to latch the door in closed position.

7. The combination comprising a plurality of cages, a frame for receiving and supporting said plurality of cages with the cages free for insertion into the frame and removal therefrom, doors on the cages mounted for removal from the frame with the cages and for movement relative to the cages between open and closed positions, an elongated rod extending along an axis and mounted to the frame to turn about said axis, an elongated element mounted to one of said cages for removal from the frame therewith and operable to actuate said door of that cage between open and closed positions, a detachable connection between said rod and a first end of said element for actuating said element to move the door in response to rotary movement of the rod but detachable to enable removal of said element from the frame and rod with the cage, said connection including interfitting means on said rod and first end of said element for removably mounting the element to the rod in a position of projection therefrom essentially radially outwardly from said axis, and a latch keeper on the cage detachably engageable by a second end of said element in a relation releasably latching said door in closed position.

8. The combination comprising a plurality of cages, a frame for receiving and supporting said plurality of cages with the cages free for insertion into the frame and removal therefrom, doors on the cages mounted for removal from the frame with the cages and for movement relative to the cages between open and closed positions, an elongated rod extending along an axis and mounted to the frame to turn about said axis, an elongated element mounted to one of said cages for removal from the frame therewith and operable to actuate said door of that cage between open and closed positions, a detachable connection between said rod and a first end of said element for actuating said element to move the door in response to rotary movement of the rod but detachable to enable removal of said element from the frame and rod with the cage, said connection including interfitting means on said rod and first end of said element for removably mounting the element to the rod in a position of projection therefrom essentially radially outwardly from said axis, a latch keeper on the cage detachably engageable by a second end of said element in a relation releasably latching said door in closed position, and a spring yieldingly urging said elongated element longitudinally toward said rod and into interfitting relation therewith.

9. The combination comprising a plurality of cages, a frame for receiving and supporting said plurality of cages with the cages free for insertion into the frame and removal therefrom, doors on the cages mounted for removal from the frame with the cages and for movement relative to the cages between open and closed positions, an elongated rod extending along an axis and mounted to the frame to turn about said axis, an elongated element mounted to one of said cages for removal from the frame therewith and operable to actuate said door of that cage between open and closed positions, a detachable connection between said rod and a first end of said element for actuating said element to move the door in response to rotary movement of the rod but detachable to enable removal of said element from the frame and rod with the cage, said connection including interfitting means on said rod and first end of said element for removably mounting the element to the rod in a position of projection therefrom essentially radially outwardly from said axis, a latch keeper on the cage detachably engageable by a second end of said element in a relation releasably latching said door in closed position, a spring yieldingly urging said elongated element longitudinally toward said rod and into interfitting relation therewith, and means mounting said elongated element to said door of said one cage for longitudinal movement essentially transversely of said axis into and out of interfitting relation with said rod, and for swinging movement relative to said door to a position of oblique angularity to said axis in which said second end is engageable with said latch keeper.

10. The combination as recited in claim 9, in which said last mentioned means include a mounting bracket containing an aperture within which said element is confined loosely to enable said swinging movement thereof.

11. The combination as recited in claim 9, in which said last mentioned means include a mounting bracket containing an aperture within which said element is confined loosely to enable said swinging movement thereof, and a second bracket containing an aperture within which said first end of said element is removably receivable in said position of oblique angularity of said element to said axis.

12. The combination comprising a plurality of cages, a frame for receiving and supporting said plurality of cages with the cages free for insertion into the frame and removal therefrom, doors on the cages mounted for removal from the frame with the cages and for movement relative to the cages between open and closed positions, an actuating member mounted movably to said frame, mechanism for actuating said door of one of the cages between open and closed positions and mounted movably to said one cage, said mechanism having a first portion detachably engageable with said member for actuation thereby in a door actuating direction, a latch element carried by the cage, and said mechanism having a second portion engageable by said latch element in a relation to lock the door in closed position.

13. The combination recited in claim 12, including means mounting said mechanism to said cage door for opening and closing movement therewith and for shifting movement relative thereto between a position of interfitting engagement with said actuating member and a position of locking engagement with said latch element.

14. The combination comprising a frame defining a plurality of compartments arranged in several superimposed tiers having a series of compartments in each tier, a plurality of cages removably insertible into said compartments respectively to form several tiers of cages with several cages in each tier, doors on said cages hinged thereto along lower edges of the doors for outward and downward swinging movement from closed positions to open positions, a plurality of elongated actuating rods mounted to said frame in positions of extension essentially horizontally along essentially the lower edges of said doors of different tiers of the cages, means mounting each of said elongated rods to turn about essentially the longitudinal axis thereof, each rod containing a series of socket recesses extending thereinto transversely of the axis of the rod, a plurality of second rods mounted movably to said doors respectively of the cages and having first ends removably receivable in said socket recesses to swing the doors between open and closed positions in response to rotary movement of said first mentioned rods, spring means yieldingly urging said second rods into said socket recesses, latching elements on said cages detachably engageable with said second rods in a relation locking the doors in closed positions, and means for turning a plurality of said first mentioned rods in unison to simultaneously open the doors of several tiers of said cages.

References Cited by the Examiner

UNITED STATES PATENTS

| | | | |
|---|---|---|---|
| 751,466 | 2/1904 | Colling | 211—134 |
| 1,006,983 | 10/1911 | Schaffert | 292—53 |
| 1,257,796 | 2/1918 | Brooks | 119—45 |
| 2,446,800 | 8/1948 | Arrighi | 296—28 |
| 2,733,427 | 1/1956 | Chandler | 119—45 X |
| 2,857,880 | 10/1958 | Stone | 119—17 |
| 3,027,871 | 4/1962 | Peterson | 119—45 |
| 3,066,647 | 12/1962 | Moller | 119—15 |
| 3,125,068 | 3/1964 | Hampton | 119—17 |
| 3,195,506 | 7/1965 | Beard | 119—19 |
| 3,214,030 | 10/1965 | Graham et al. | 211—71 |

SAMUEL KOREN, *Primary Examiner.*

ALDRICH F. MEDBERY, *Examiner.*